United States Patent [19]
Nishikawa

[11] Patent Number: 5,581,612
[45] Date of Patent: Dec. 3, 1996

[54] PRIVATE BRANCH EXCHANGE SYSTEM

[75] Inventor: Shigeru Nishikawa, Yokohama, Japan

[73] Assignee: Canon Kaubshiki Kaisha, Tokyo, Japan

[21] Appl. No.: 128,756

[22] Filed: Sep. 30, 1993

Related U.S. Application Data

[63] Continuation of Ser. No. 658,405, Feb. 20, 1991, abandoned.

[30] Foreign Application Priority Data

| Feb. 22, 1990 | [JP] | Japan | 2-039638 |
| Sep. 17, 1990 | [JP] | Japan | 2-243766 |
| Sep. 17, 1990 | [JP] | Japan | 2-243767 |
| Sep. 18, 1990 | [JP] | Japan | 2-246251 |

[51] Int. Cl.$^6$ .................................................. H04M 1/74
[52] U.S. Cl. ...................... 379/387; 379/156; 379/322; 379/377
[58] Field of Search ........................ 379/3, 32, 377, 379/379, 322, 279, 156, 387

[56] References Cited

U.S. PATENT DOCUMENTS 4,575,584   3/1986   Smith et al. ............................ 379/279

FOREIGN PATENT DOCUMENTS

| 3011507 | 10/1980 | Germany. | |
| 2149615A | 6/1985 | Germany. | |
| 3431074 | 2/1986 | Germany. | |
| 58-3008 | 1/1983 | Japan. | |
| 0103896 | 8/1985 | Japan | 379/379 |
| 60-103896 | 10/1985 | Japan. | |
| 61-023496 | 6/1986 | Japan. | |

OTHER PUBLICATIONS

"Novelink: A Small, Multifeature PABX"; By R. A. Steinberg; 1225 Electrical Communication vol. 61, No. 4, Feb. 26, 1987; Brussels, BE pp. 439–445.

*Primary Examiner*—Krista M. Zele
*Assistant Examiner*—Fan Tsang
*Attorney, Agent, or Firm*—Fitzpatrick, Cella, Harper & Scinto

[57] ABSTRACT

In a private branch exchange system which includes a private branch exchange accommodating a plurality of line wires and extensions for switching lines between the two, and telephones, which are usable in the event of a power failure, connected to the extensions, the line wires and the power-failure telephones are connected when power feed to the private branch exchange is no longer performed owing to a power failure or the like. When power feed is restored, the call status of the power-failure telephone is monitored and, if it is found that a call is in progress.

25 Claims, 12 Drawing Sheets

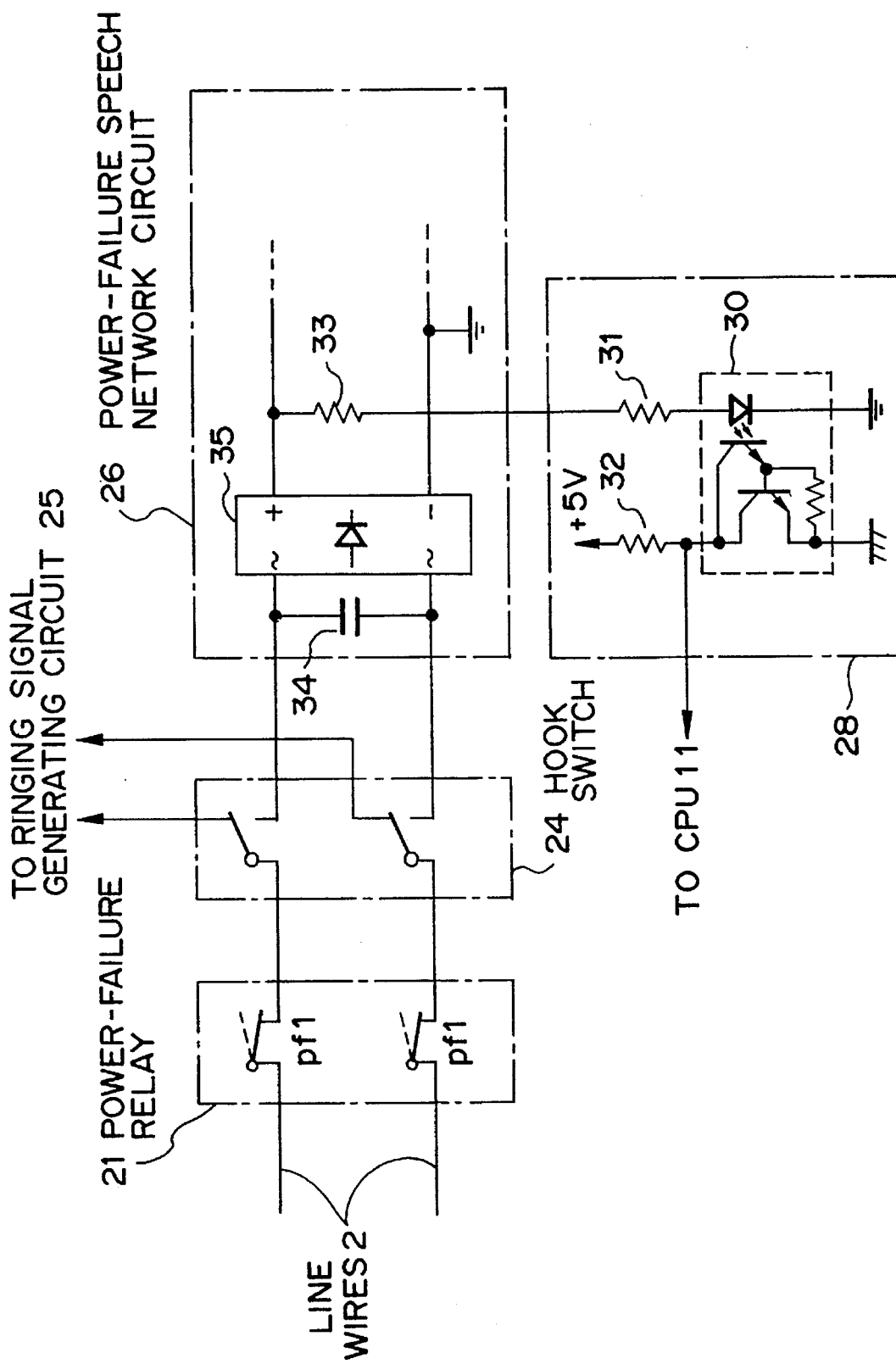
F I G. 11

PRIVATE BRANCH EXCHANGE SYSTEM

This application is a continuation of U.S. patent application Ser. No. 07/658,405 filed Feb. 20, 1991, now abandoned.

BACKGROUND OF THE INVENTION

1. Field of the Invention

This invention relates to a private branch exchange system and, more particularly, to a private branch exchange system which accommodates external line wires and extensions and, on the extension side, communications equipment usable in event of a power failure, wherein communications such as a telephone conversation can be carried out by the communications equipment for power failure when a power failure occurs.

2. Description of the Prior Art

In a private branch exchange, a well-known technique in the prior art is to change over the circuit to a telephone for power failure when a power failure occurs, thereby making it possible to receive calls and make calls during the power failure.

FIG. 4 illustrates the construction of the conventional private branch exchange apparatus. As shown in FIG. 4, numeral 400 denotes an external line wire, 401 a line-wire changeover relay, 404 an exchange apparatus, 406 a extension changeover relay, and 408 an extension telephone usable in the event of a power failure. When the exchange 404 is being supplied with power from a commercial power supply or the like in a normal manner, the line wire 400 is connected to the exchange 404 via the make side (indicated by the dashed line) of the line-wire changeover relay 401 and a line 403.

A telephone call is placed by way of a path leading to the power-failure backup telephone 408 via a line 405, a line on the make side (indicated by the dashed line) of the extension changeover relay 406, and a line 407. When the supply of power to the exchange 404 ceases owing to a power failure or the like, the line-wire changeover relay 401 and the extension changeover relay 406 are restored automatically so that the line wire 400 is connected directly to the power-failure backup telephone 408.

When supply of power to the exchange 404 is restored, the line-wire exchange relay 401 and extension changeover relay 406 are driven automatically so that a telephone call can be placed via the ordinary route, described above.

Further, in another example of the prior art, the line-wire exchange relay 401 and extension changeover relay 406 may be replaced by manually operated changeover switches.

A problem encountered in the above-described example of the prior art is that when the extension telephone usable in a power failure starts to be used during a power failure and then power is restored during a telephone conversation, the path being used for the conversation is cut unconditionally if the line-wire and extension changeover means are automatic means, such as relays. As a result, the call is cut off while still in progress.

If the line-wire and extension changeover means are manual means such as switches, on the other hand, an operating error is possible if the switches are operated erroneously or if the operator forgets to make a changeover. In addition, operating the switches is troublesome and therefore the system is not easy to use.

SUMMARY OF THE INVENTION

Accordingly, an object of the present invention is to provide a private branch exchange in which back-up and restoration processing of a line at occurrence of a power failure is performed automatically and reliably without requiring a troublesome operation.

Another object of the present invention is to provide a private branch exchange which uses communications equipment, usable in during a power failure, having both line-wire and extension interfaces, wherein the service functions of the exchange can be restored promptly at restoration of power, or wherein channel backup and restoration processing can be performed reliably even when a power failure occurs repeatedly.

Still another object of the present invention is to provide a private branch exchange system in which restoration from a power failure can be carried out without interrupting communication in progress.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a block diagram showing the peripheral circuitry of a call monitoring circuit.

DESCRIPTION OF THE PREFERRED EMBODIMENTS

Embodiments of the present invention will now be described in detail with reference to the drawings.

Figure 1:
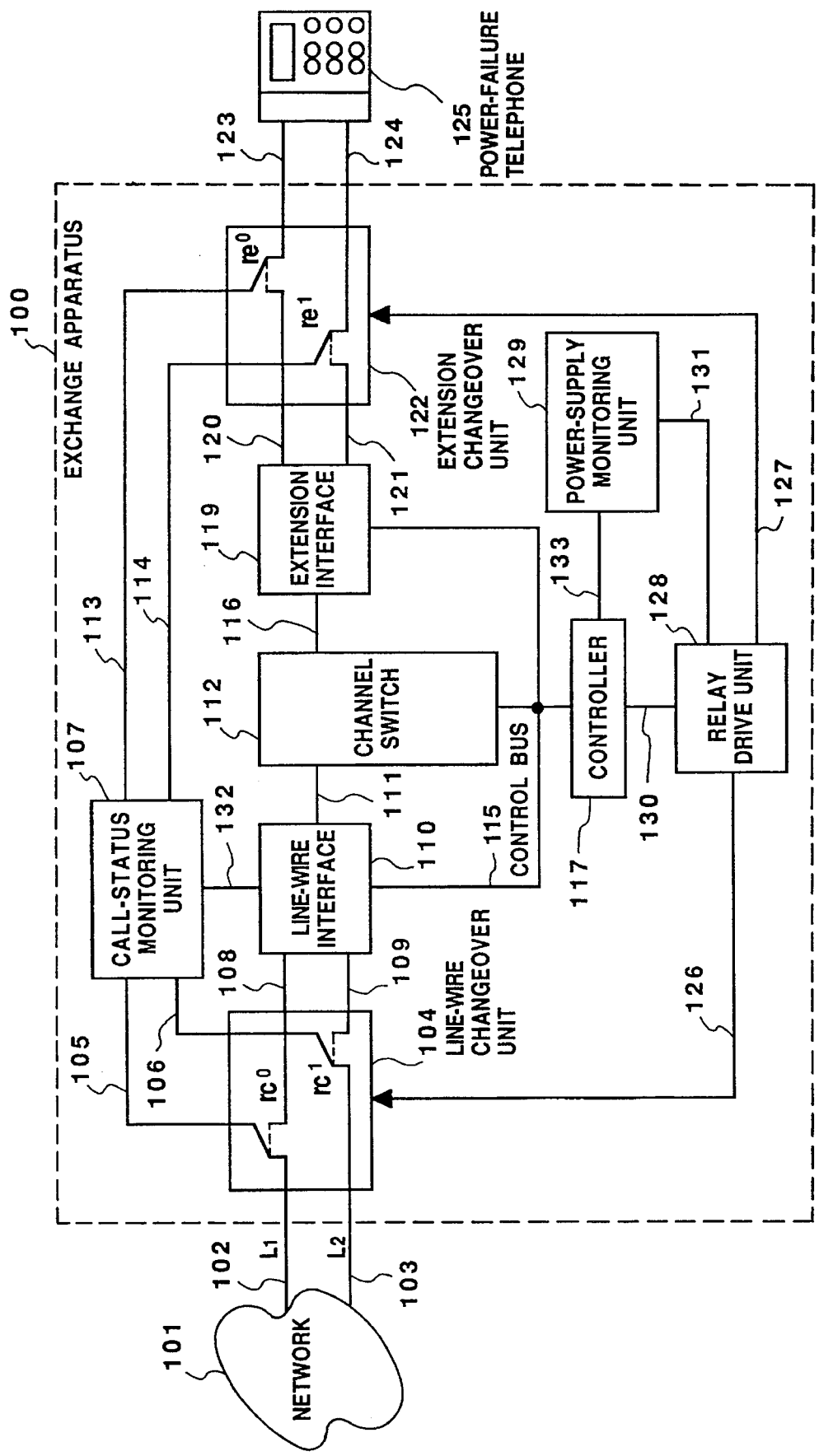
FIG. 1 is a block diagram illustrating the construction of an embodiment of a private branch exchange employing the present invention.

FIG. 1 is a block diagram illustrating a private branch exchange apparatus employing the present invention. Shown in FIG. 1 are the main apparatus 100 of the private branch exchange, a network 101 connected to line wires 102, 103, and a line-wire changeover unit 104 having relay contacts rc0, rc1. Under the control of a relay drive unit 128, the changeover unit 104 connects line wires $L_1$ 102, $L_2$ 103 to a call-status monitoring unit 107 via lines 105, 106, and to a line-wire interface 110 via lines 108, 109.

The line-wire interface 110 is connected to a call channel switch 112 via a call channel 111.

An extension changeover unit 122 has relay contacts re0, re1. Under the control of the relay drive unit 128, the extension changeover unit 122 connects either lines 113, 114 from the call-status monitoring unit 107 or the lines 120, 121 from the extension interface 119 to lines 123, 124, respectively, of a telephone 125 usable in the event of a power failure. (The telephone 125 will be referred to as a "power-failure telephone" where appropriate.)

Also connected to the exchange apparatus 100 is an extension telephone (not shown) capable of being used for conversation when the power supply is operating normally. In addition, the exchange apparatus 100 is capable of accommodating two or more line wires so that a plurality of telephones usable in a power failure can be accommodated. An extension interface 119 is connected to the call channel switch 112 via a call channel 116, and to an extension changeover unit 122 via lines 120, 121.

A controller 117 is for controlling the overall main apparatus 100 and is connected to the line-wire interface 110, the extension interface 119 and the call channel switch 112 via a control bus 115. Furthermore, the controller 117 controls the relay drive unit 128 via a signal line 130 and receives information from a power-supply monitoring unit 129 via a signal line 133.

The operation of this apparatus when a power failure is detected, operation when a call is in progress during a power failure, operation immediately after power is restored, and operation at the end of a call will now be described.

OPERATION AT DETECTION OF POWER FAILURE

When a power source, an ordinary commercial power supply or an emergency power supply such as a battery, which are for supplying electric power to the main apparatus 100, develop trouble and fail and the relay drive unit 128 is informed of occurrence of this power failure by a signal line 131 from the power-supply monitoring unit 129, the contacts rc0, rc1 of the line-wire changeover unit 104 are driven so as to be connected to the side of lines 105, 106. Similarly, the contacts re0, re1 of the extension changeover unit 122 are driven so as to be connected to the side of lines 113, 114.

Accordingly, at the completion of these operations, the network 101 will be connected to the call-status monitoring unit 107 via the lines 102, 103, the contacts rc0, rc1 of line-wire changeover unit 104 and the lines 105, 106, and the lines 123, 124 connected to the power-failure telephone 125 will be connected to the call-status monitoring unit 107 via the contacts re0, re1 of the extension changeover unit 122 and the lines 113, 114.

CALL OPERATION DURING POWER FAILURE

Figure 2:
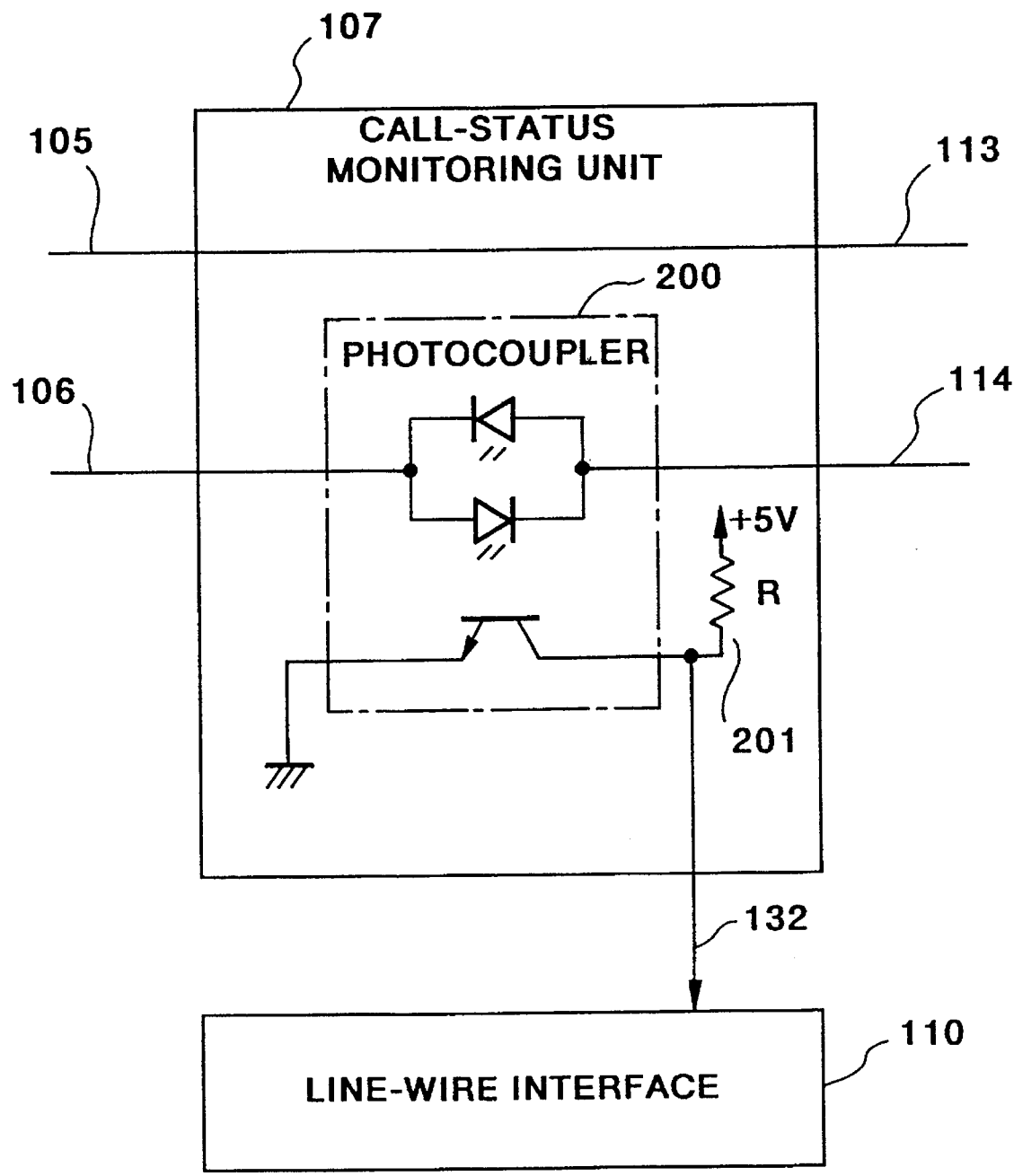
FIG. 2 is a block diagram illustrating the construction of a unit, shown in FIG. 1, for monitoring the status of a call.

The construction of the call-status monitoring unit 107 shown in FIG. 2 will be described before discussing operation during a power failure. In FIG. 2, numeral 200 denotes a photocoupler having bidirectional light-emitting elements connected to lings 106, 114. Line 105 is connected directly to line 113. The collector of a transistor on the light-emitting side of the photocoupler 200 is connected to a +5 V power supply via a resistor 201, and the emitter of the transistor is connected to ground.

In response to an incoming call from lines 102, 103 or an outgoing call from the power-failure telephone 125, a call current from line 102 is passed through a DC circuit in power-failure telephone 125 via the line 105, call-status monitoring unit 107 and lines 113, 123. The current then flows from the telephone 125 to line 103 via lines 124, 114, the light-emitting elements of the photocoupler 200 in the call-status monitoring unit 107, and line 106.

The light-emitting elements of the photocoupler 200 at this time emit light so that the transistor on the light-receiving side is turned on. However, since a power failure is in effect, the power of +5 V is not being supplied to the transistor. Therefore, an electric signal does not flow into a signal line 132. Under these conditions, the call is allowed to continue.

OPERATION IMMEDIATELY AFTER POWER RESTORATION

Figure 3:
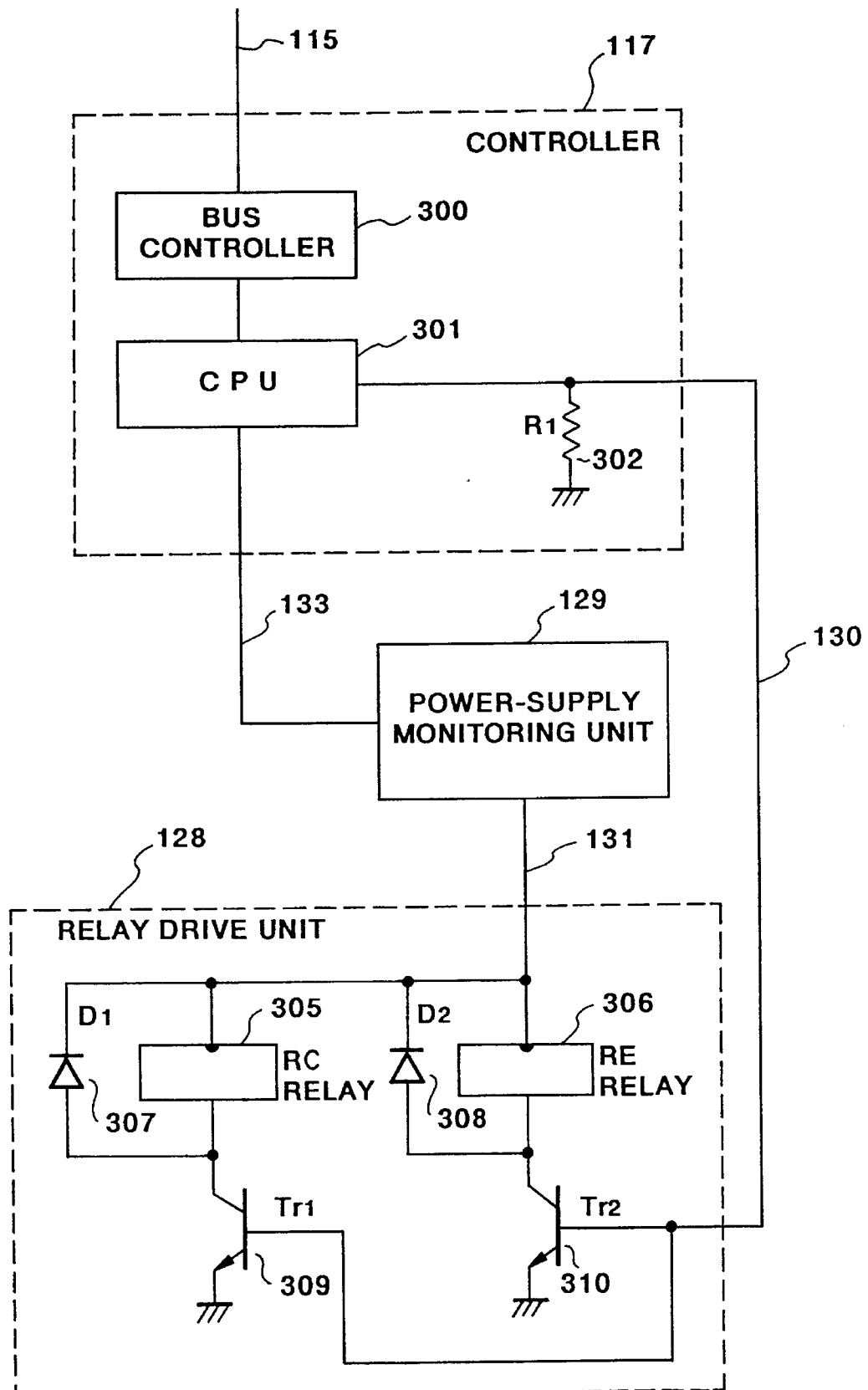
FIG. 3 is a block diagram illustrating the construction of a control unit and relay drive unit shown in FIG. 1.
Figure 4:
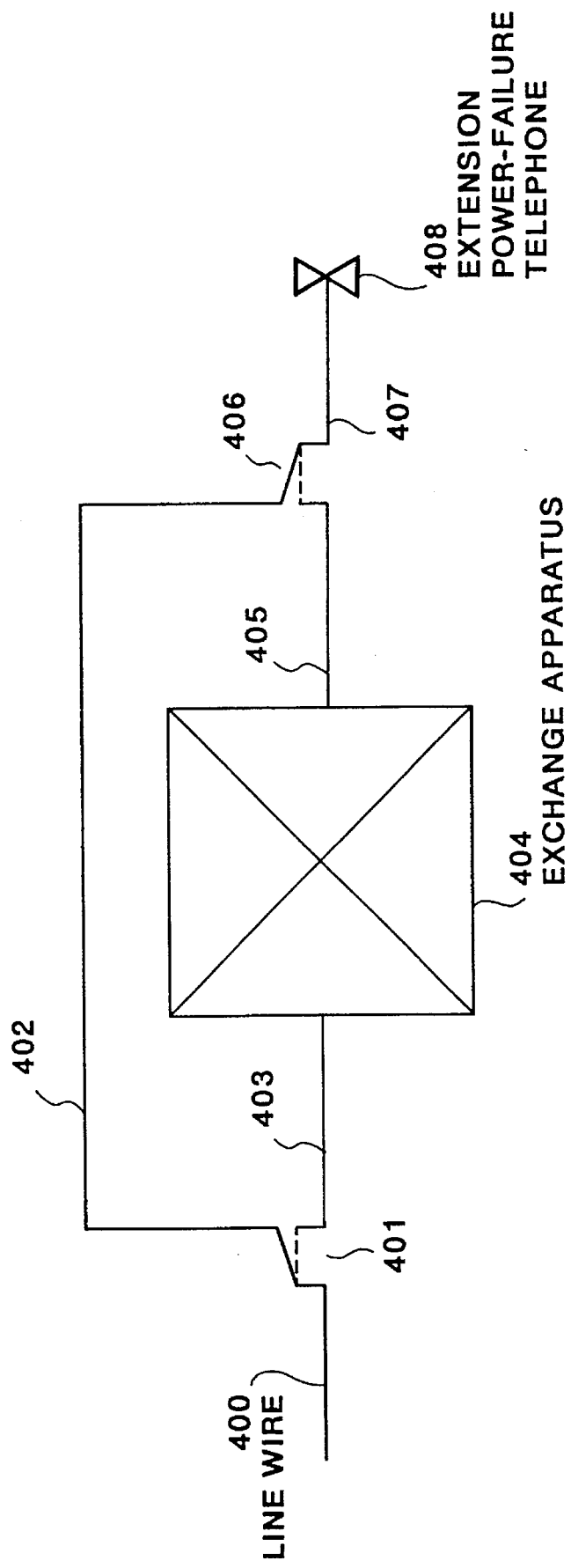
FIG. 4 is a block diagram illustrating the construction of a private branch exchange apparatus according to the prior art.

When the problem in the power supply for supplying power to the main apparatus 100 is solved, recovery is effected from the power failure and flow of current is restored, the power-supply status monitoring unit 129 sends a restoration signal to the controller 117 via the signal line 133 and to the relay drive unit 128 via the signal line 131. FIG. 3 illustrates the construction of the controller 117 and relay drive unit 128.

The controller 117 in FIG. 3 includes a bus controller 300 connected to the control bus 115 for performing bus control, and to a CPU 301. An output terminal of CPU 301 for connecting the signal line 130 to the relay driving unit 128 attains a high-impedance state, when the CPU 301 is in the reset state, if a three-state circuit is used. The signal line 130 can be fixed at a potential of 0 V at this time by a resistor $R_1$ 302. The signal line 133 from the power-supply monitoring unit 129 also is connected to the CPU 301.

The relay drive unit 128 includes an RC relay 305. The contacts rc0, rc1 thereof are in the line-wire changeover unit 104. The relay drive unit 128 also includes an RE relay 306 whose contacts re0, re1 are in the extension changeover unit 122. Diodes $D_1$ 307, $D_2$ 308 are for protecting the relay from back emf. Numeral 309 denotes a transistor $Tr_1$, and 310 a transistor $Tr_2$. Since no electricity is supplied from the power-supply monitoring unit 129 via signal line 131 at the time of a power failure, neither the RC relay 305 nor the RE relay 306 are driven, and therefore these contacts are connected as indicated by the solid lines in FIG. 1.

Immediately after the restoration from the power failure, the power-supply monitoring unit 129 detects such restoration. When this is done, a relay-driving current starts being supplied to the relay drive unit 128 through the signal line 131, and the CPU 301 of the controller 117 is informed of restoration via signal line 133. Since the power of +5 V is supplied to each of the components with restoration, the electric circuitry begins operating.

For several tens of milliseconds immediately after the rise in voltage to +5 V, a power-on reset signal generally is supplied to each of the components in order to initialize the status of the overall apparatus. The CPU 301 also is reset as a result.

Since the signal line 130 is fixed at 0 V at this time, as described above, the RC relay 305 and RE relay 306 can be prevented from operating unstably during the transient period at rise of the 5 V power supply. When the reset state ends, the CPU 301 immediately outputs 0 V to the signal line 130 to turn off the transistors 309, 310 in order to hold the RC relay 305 and RE relay 306 in the power-failure state.

The operation of the call-status monitoring unit 107 in FIG. 2 will now be described.

The call-status monitoring unit 107 is so adapted that when a call current-flows from line 106 to line 114 or from line 114 to line 106, the light-emitting elements emit light, thereby turning on the transistor on the receiving side so that the potential on signal line 132 is changed from +5 V to 0 V. When the call current no longer flows, the transistor on the receiving side is turned off so that the potential on the signal line 132 is changed from 0 V to +5 V.

Accordingly, when the +5 V power supply rises to this voltage, the 0 V signal is sent from signal line 132 to the line-wire interface 110, as described above, if a call is in progress. When the line-wire interface 110 receives this 0 V signal, the CPU 301 of the controller 117 is informed via control bus 115, after the reset state is terminated, of the fact that a call is in progress. As a result, the CPU 301 continues to output 0 V to signal line 130 and holds the RC relay 305 and RE relay 306 in the power-failure state.

If a call is not in progress, on the other hand, the +5 V signal is sent from signal line 132 to the line-wire interface 110, as set forth earlier. When the line-wire interface 110 receives this +5 V signal, the CPU 301 of controller 117 is informed via control bus 115, after the reset state is terminated, of the fact that a call is not in progress. As a result, the CPU 301 outputs +5 V to signal line 130 to turn on the transistors 309, 310, thereby driving the RC relay 305 and RE relay 306 so that the contacts thereof are connected to the sides indicated by the dashed lines in FIG. 1.

OPERATION AT END OF CALL

When a call allowed to continue from the onset of a power failure is maintained even after restoration of power and is subsequently terminated, the potential on signal line 132 from the call-status monitoring unit 107 is changed from 0 V to 5 V. When this change is detected by the line-wire interface 110 and the controller 117 is so informed via the control bus 115, the CPU 301 raises the potential on signal line 130 to +5 V to drive the RC relay 305 and RE relay 306, whereby these contacts are connected to the sides indicated by the dashed lines in FIG. 1.

In accordance with the embodiment described above, the main apparatus is provided with means for monitoring the status of the power-failure telephone after restoration from a power failure. By automatically controlling means for changing over between the line wire and extension based upon the results of monitoring, a call allowed to continue from the onset of the power failure is maintained even after power is restored. Accordingly, a call is no longer interrupted while in progress, as occurs in the prior art.

When the call ends, this is detected and the ordinary operating state is restored automatically. As a result, the private branch exchange does not rely upon manual means, as in the prior art, and therefore is highly reliable and easy to use.

In accordance with the first embodiment, as evident from the foregoing description, there is provided a private branch exchange apparatus disposed between line wires and extensions for performing line switching between them and for connecting a power-failure telephone on the extension side to the line wire when a power failure occurs, the apparatus having connecting means for connecting the power-failure telephone on the extension side to the line wire when a power failure occurs, detecting means for detecting restoration of power after the power failure occurs, and monitoring means for monitoring the call status of the power-failure telephone immediately after the restoration of power. When the power-failure telephone is in a call state at restoration of power, the line connection of the connecting means is maintained until the call ends. At the end of a call, the line connection is restored to the ordinary state. Accordingly, if the power-failure telephone is being used for a call at restoration from a power failure, the call is allowed to continue. Line control is returned automatically to the ordinary state, in which power is being supplied, at the moment the call ends. Thus, a telephone conversation allowed to continue from the onset of a power failure is not interrupted when power is restored. In addition, since manual restoration is not required, exchange control can be restored to the ordinary state without error.

A second embodiment of the present invention will now be described with reference to the drawings.

Figure 5:
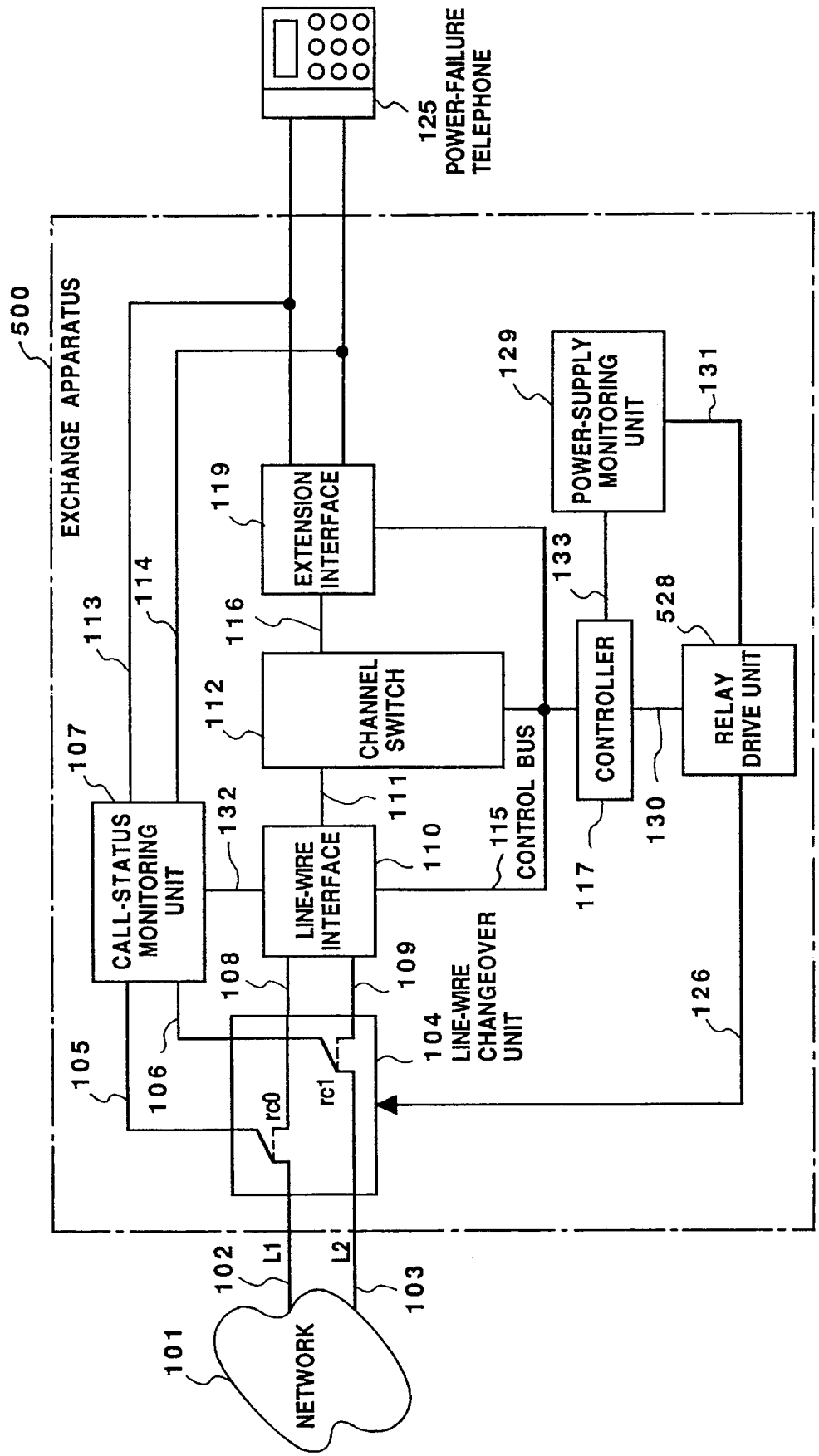
FIG. 5 is a block diagram illustrating a private branch exchange in a second embodiment of the present invention.

FIG. 5 is a block diagram showing the construction of a private branch exchange apparatus according to the second embodiment. Portions similar to those shown in FIG. 1 are designated by like reference characters and need not be described again.

In this embodiment, the extension changeover unit 122 is deleted from the arrangement shown in FIG. 1, and the construction of a relay drive unit 528, described below, is simplified.

CONSTRUCTION OF APPARATUS

Shown in FIG. 5 are the main apparatus 500 of the private branch exchange, the network 101 connected to the line wires 102, 103, and the line-wire changeover unit 104 having relay contacts rc0, rc1. Under the control of a relay drive unit 528, the changeover unit 104 connects the line wires $L_1$ 102, $L_2$ 103 to the call-status monitoring unit 107 via the lines 105, 106, and to the line-wire interface 110 via the lines 108, 109.

The line-wire interface 110 is connected to the call channel switch 112 via the call channel 111. The lines 113, 114 from the call-status monitoring unit 107 are connected to the extension interface 119 and power-failure telephone 125, respectively.

The controller 117, which is constituted by a microprocessor or the like, administers overall control of the private branch exchange apparatus 500. The controller 117 is connected to the line-wire interface 110, the extension interface 119 and the call channel switch 112 via the control bus 115. Furthermore, the controller 117 controls the relay drive unit 528 via the signal line 130 and receives information from the power-supply monitoring unit 129 via a signal line 133.

The operation of this apparatus when a power failure is detected, operation when a call is in progress during a power failure, operation immediately after power is restored, and operation at the end of a call will now be described. When necessary, the detailed construction of each portion of FIG. 5 will be described with reference to FIGS. 2 and 6.

OPERATION AT DETECTION OF POWER FAILURE

When a power source, an ordinary commercial power supply or an emergency power supply such as a battery, which are for supplying electric power to the main apparatus 500, develop trouble and fail and the relay drive unit 528 is informed of occurrence of this power failure via signal line 131 from the power-supply monitoring unit 129, the contacts rc0, rc1 of the line-wire changeover unit 104 are driven so as to be connected to the side of lines 105, 106.

Accordingly, at the completion of these operations, the network 101 (line wires 102, 103) will be connected to the call-status monitoring unit 107 via the contacts rc0, rc1 of line-wire changeover unit 104 and the lines 105, 106, and the power-failure telephone 125 will be connected to the call-status monitoring unit 107.

CALL OPERATION DURING POWER FAILURE

In FIG. 2, numeral 200 denotes the photocoupler having bidirectional light-emitting elements connected to lines 106, 114. Line 105 is connected directly to line 113. The collector of the transistor on the light-receiving side of the photocoupler 200 is connected to the +5 V power supply via the resistor 201, and the emitter of the transistor is connected to ground.

When a call current flows from line 106 to line 114 or from line 114 to line 106, the light-emitting elements of the photocoupler 200 emit light and the transistor on the light-receiving side is turned on, whereby the potential on line 132 is changed from +5 V to 0 V. When the call current ceases flowing, on the other hand, the transistor on the light-receiving side is turned off, whereby the potential on line 132 is changed from 0 V to +5 V.

After a reply to an incoming call from line wires 102, 103 or in response to an outgoing call from the power-failure telephone 125, a call current from line wire 102 is passed through a DC circuit in power-failure telephone 125 via the line 105, call-status monitoring unit 107 and line 113. The current then flows from the telephone 125 to line wire 103 via line 114, the light-emitting elements of the photocoupler 200 in the call-status monitoring unit 107, and line 106.

The light-emitting elements of the photocoupler 200 at this time emit light so that the transistor on the light-receiving side is turned on. However, since a power failure is in effect, the power of +5 V is not being supplied to the transistor. Therefore, an electric signal does not flow into signal line 132. Under these conditions, the call is allowed to continue even after the power failure.

OPERATION IMMEDIATELY AFTER POWER RESTORATION

Figure 6:
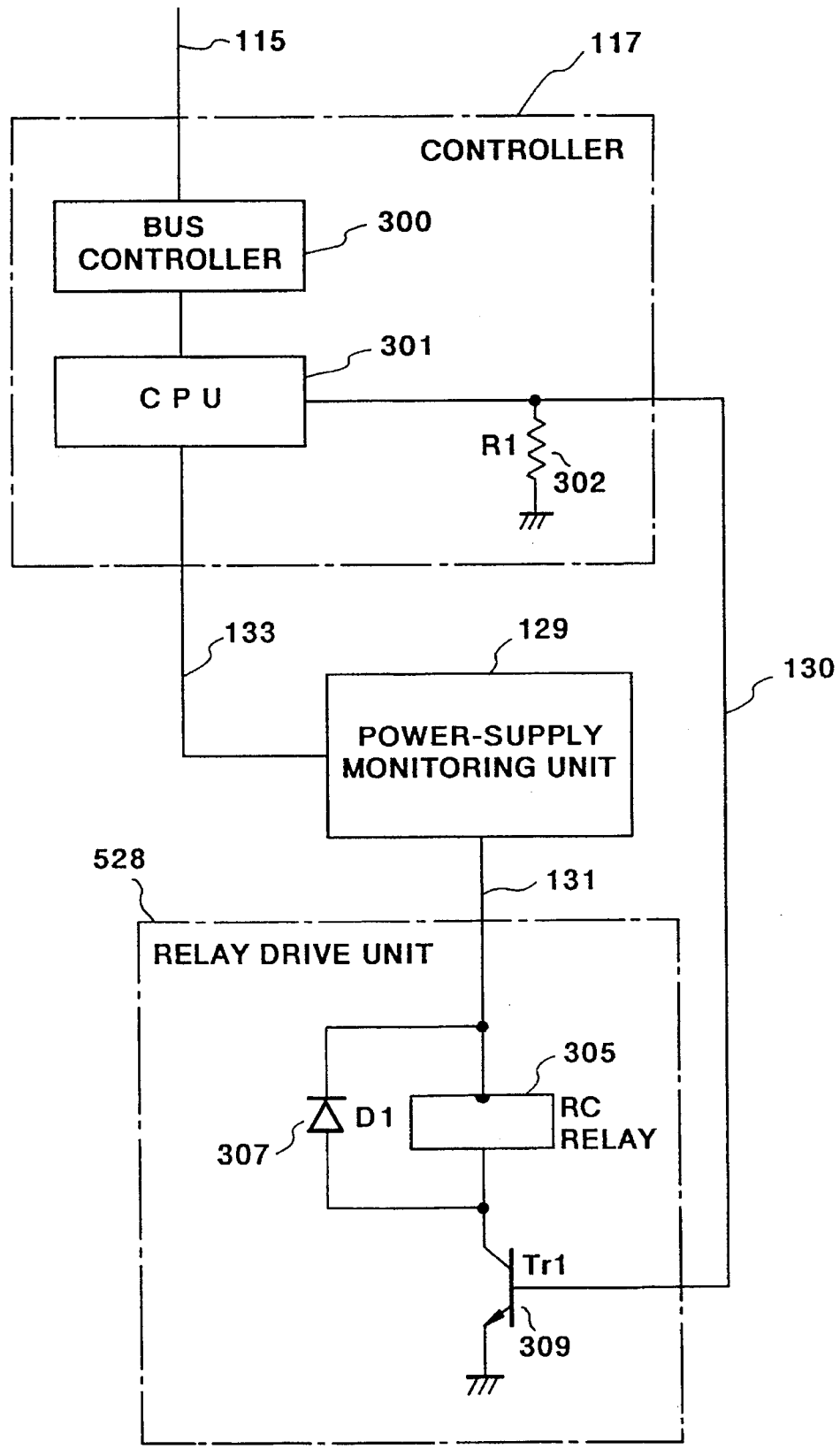
FIG. 6 is a block diagram illustrating the construction of a control unit and relay drive unit shown in FIG. 5.

When the problem in the power supply for supplying power to the private branch exchange apparatus is solved, recovery is effected from the power failure and flow of current is restored, the power-supply status monitoring unit 129 sends a restoration signal to the controller 117 via the signal line 133 and to the relay drive unit 528 via the signal line 131. FIG. 6 illustrates the construction of the controller 117 and relay drive unit 528.

The controller 117 in FIG. 6 includes the bus controller 300 connected to the control bus 115 for performing bus control, and to the CPU 301 comprising a microprocessor or the like. The output terminal of CPU 301 for connecting the signal line 130 to the relay driving unit 528 attains a high-impedance state, when the CPU 301 is in the reset state, if a three-state circuit is used. The signal line 130 can be fixed at a potential of 0 V at this time by the resistor $R_1$ 302. The signal line 133 from the power-supply monitoring unit 129 also is connected to the CPU 301.

The relay drive unit 528 also includes the RC relay 305 whose contacts rc0, rc1 are in the line-wire changeover unit 104.

The diode $D_1$ 307 is for protecting the relay from back emf. Numeral 309 denotes the transistor $Tr_1$. Since no electricity is supplied from the power-supply monitoring unit 129 via signal line 131 at the time of a power failure, the RC relay 305 is not driven, and the contacts thereof are connected as indicated by the solid lines in FIG. 5.

Immediately after the restoration from the power failure, the power-supply monitoring unit 129 detects such restoration. When this is done, relay-driving power starts being supplied to the relay drive unit 528 through the signal line 131, and the CPU 301 of the controller 117 is informed of restoration via signal line 133. Since the power of +5 V is supplied to each of the components with restoration, the electric circuitry begins operating.

For several tens of milliseconds immediately after the rise in voltage to +5 V, a power-on reset signal generally is supplied to each of the components in order to initialize the status of the overall apparatus. The CPU 301 also is reset as a result. Since the signal line 130 is fixed at 0 V at this time, as described above, the RC relay 305 can be prevented from operating unstably during the transient period at rise of the 5 V power supply. When the reset state ends, the CPU 301 immediately outputs 0 V to the signal line 130 to turn off the transistor $Tr_1$ in order to hold the RC relay 305 in the power-failure state.

When a transition is made to operation of the call-status monitoring unit 107 in FIG. 2, the +5 V power supply rises to this voltage. When this is done, the 0 V signal is sent from signal line 132 to the line-wire interface 110, as described above, if a call is in progress. When the line-wire interface 110 receives this 0 V signal, the CPU 301 of the controller 117 is informed via control bus 115, after the reset state is terminated, of the fact that a call is in progress. As a result, the CPU 301 continues to output 0 V to signal line 130 and holds the RC relay 305 in the power-failure state.

If a call is not in progress, on the other hand, the +5 V signal is sent from signal line 132 to the line-wire interface 110, as set forth earlier. When the line-wire interface 110 receives this +5 V signal, the CPU 301 of controller 117 is informed via control bus 115, after the reset state is terminated, of the fact that a call is not in progress. As a result, the CPU 301 outputs +5 V to signal line 130 to turn on the transistor 309, thereby driving the RC relay 305 so that the contacts thereof are connected to the sides indicated by the dashed lines in FIG. 5.

OPERATION AT END OF CALL

When a call allowed to continue from the onset of a power failure is maintained even after restoration of power and is subsequently terminated, the signal 132 from the call-status monitoring unit 107 is changed from 0 V to 5 V. Therefore, when this change is detected by the line-wire interface 110 and the controller 117 is so informed via the control bus 115, the CPU 301 raises the potential on signal line 130 to +5 V to drive the RC relay 305, whereby these contacts are connected to the sides indicated by the dashed lines in FIG. 5.

In accordance with the embodiment described above, the main apparatus is provided with means for monitoring the status of the power-failure telephone immediately after restoration from a power failure. By automatically controlling means for changing over between the line wires and extension based upon the results of monitoring, a call allowed to continue from the onset of the power failure is maintained even after power is restored. Accordingly, a call is no longer interrupted while in progress, as occurs in the prior art.

When the call allowed to continue from the onset of the power failure ends, this is detected and the ordinary operating state is restored automatically. As a result, the private branch exchange does not rely upon troublesome manual means, as in the prior art, and therefore is highly reliable and easy to use.

In the foregoing embodiment, the arrangement illustrated is one in which line changeover at the occurrence of a power failure is performed on the line-wire side. However, as shown in FIG. 7, an arrangement 5 can be adopted in which the line changeover at the occurrence of a power failure is performed on the extension side.

Figure 7:
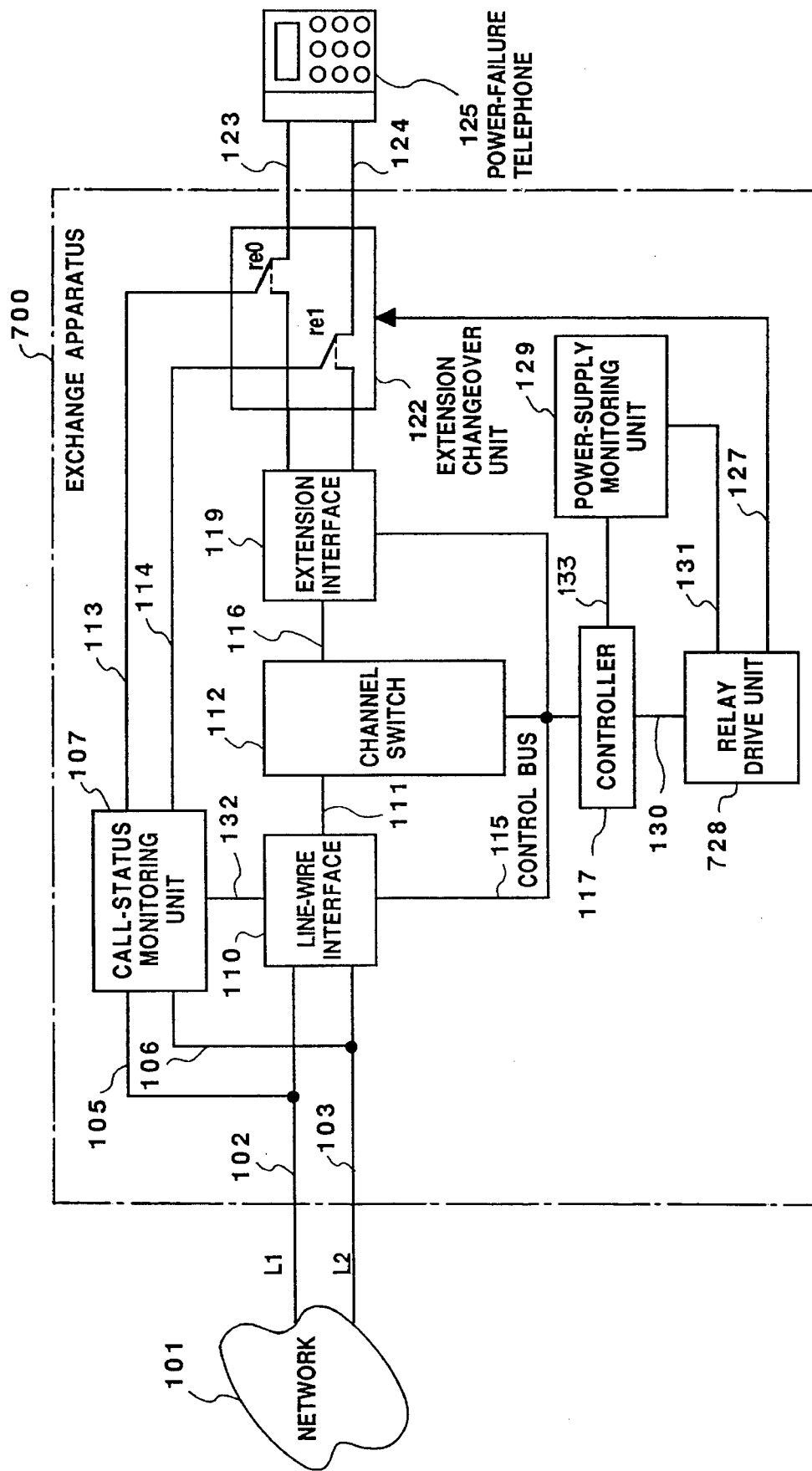
FIG. 7 is a block diagram illustrating an embodiment of a different private branch.

In FIG. 7, the extension changeover unit 122 is provided on the lines 123, 124 between the extension interface 119 and the power-failure telephone 125. The call-status monitoring unit 107 and the relay control circuitry of the extension changeover unit 122 can be constructed just as shown in FIGS. 2 and 6.

With regard to control at the occurrence of a power failure and when power is restored, the only difference is whether the line changeover is performed on the extension side or line-wire side; call-status detection and the line changeover procedure are carried out just as described above.

The advantages obtained with the arrangement of FIG. 7 are similar to those obtained with the foregoing embodiments.

It goes without saying that the telephone usable in case of a power failure can be replaced by various items of communications equipment in each of the foregoing embodiments.

Thus, in accordance with the second embodiment, as described above, there is provided a private branch exchange which accommodates line wires and extensions and, on the extension side, communications equipment usable in the event of a power failure, wherein communication can be carried out by the communications equipment for a power failure when a power failure occurs. The exchange includes means for switchingly making a connection to a line for power failure, which makes it possible to use power-failure communication equipment in event of power failure, in dependence upon the status of power feed to the private branch exchange, monitoring means for monitoring the status of communication on the line for the power failure, and control means for performing control in such a manner that if communication using the line for power failure is continuing when restoration is made from a power failure, connection to the line for power failure is maintained until the communication ends, and a changeover is made to a main-line side after the end of communication. As a result, a communication allowed to continue from the onset of a power failure can be maintained immediately following the restoration of power. When the communication ends, the ordinary operating state is restored automatically. Accordingly, the private branch exchange of the present invention does not require a troublesome manual operation, and line back-up and restoration processing at occurrence of a power failure are performed automatically and in a reliable manner.

A third embodiment of the present invention will now be described with reference to the drawings.

Figure 8:
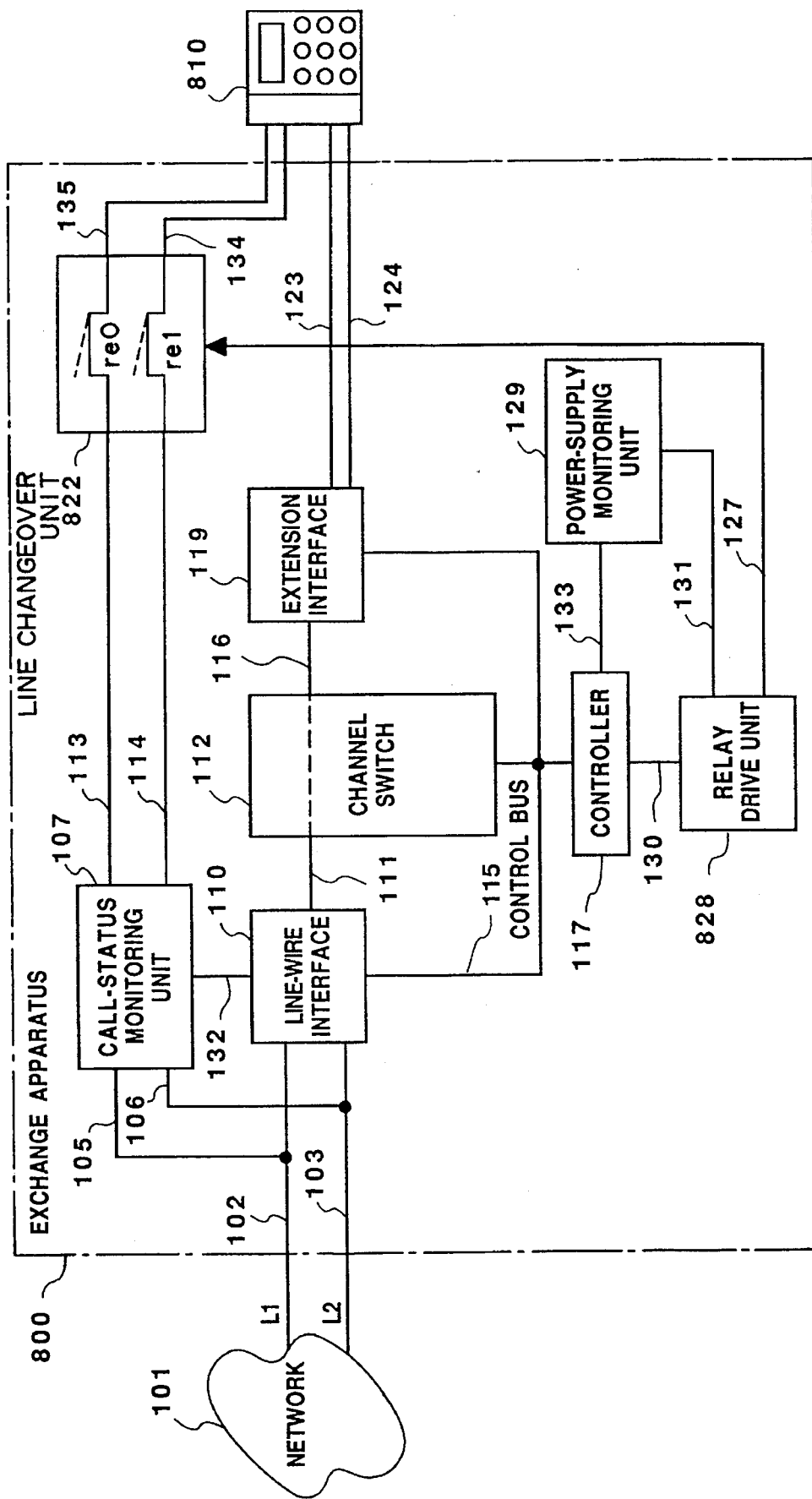
FIG. 8 is a block diagram illustrating a private branch exchange in a third embodiment of the present invention.

FIG. 8 is a block diagram illustrating the construction of a private branch exchange according to the third embodiment. Portions similar to those in the first and second embodiments are designated by like reference characters.

Shown in FIG. 8 are the main apparatus 800 of the private branch exchange, and the network 101 connected to the line wires 102, 103. The line wires 102, 103 are connected to the call-status monitoring unit 107 via the lines 105, 106, and to the line-wire interface 110.

The line-wire interface 110 is connected to the call channel switch 112 via the call channel 111. The lines 113, 114 from the call-status monitoring unit 107 are connected to line-wire interface lines 134, 135 of a power-failure telephone 810 via a line changeover unit 822.

The power-failure telephone 810 has both an extension interface and a line-wire interface. The extension interface is connected to the extension interface 119 of the main apparatus 800 via lines 123, 124.

In case of a call using the extension interface of the power-failure telephone 810, the voice data are inputted/outputted as analog or digital data between the telephone 810 and the extension interface 119 of the main apparatus 800. In addition, it is assumed that the line-wire interface of the power-failure telephone 810 is capable of operating at the time of a power failure so that a call can be placed via the lines 134, 135.

The controller 117, which is constituted by a microprocessor or the like, administers overall control of the private branch exchange apparatus 800. The controller 117 is connected to the line-wire interface 110, the extension interface 119 and the call channel switch 112 via the control bus 115. Furthermore, the controller 117 controls the relay drive unit 828 via the signal line 130 and receives information from the power-supply monitoring unit 129 via the signal line 133.

The operation of this apparatus when a power failure is detected, operation when a call is in progress during a power failure, operation immediately after power is restored, and operation at the end of a call will now be described. When necessary, the detailed construction of each portion of FIG. 8 will be described with reference to FIGS. 2 and 9.

OPERATION AT DETECTION OF POWER FAILURE

When a power source, an ordinary commercial power supply or an emergency power supply such as a battery, which are for supplying electric power to the private branch exchange apparatus 800, develop trouble and fail and the relay drive unit 828 is informed of occurrence of this power failure via signal line 131 from the power-supply monitoring unit 129, the contacts re0, re1 of the line changeover unit 822 are driven so as to be connected to the side of lines 113, 114.

Accordingly, at the completion of these operations, the network 101 (line wires 102, 103) will be connected to the call-status monitoring unit 107, and the lines 134, 135 connected to the power-failure telephone 125 are connected to the call-status monitoring unit 107 via the contacts re0, re1 of line changeover unit 822 and the lines 113, 114.

CALL OPERATION DURING POWER FAILURE

In FIG. 2, numeral 200 denotes the photocoupler having bidirectional light-emitting elements connected to lines 106, 114. Line 105 is connected directly to line 113. The collector of the transistor on the light-receiving side of the photocoupler 200 is connected to the +5 V power supply via the resistor 201, and the emitter of the transistor is connected to ground.

When a call current flows from line 106 to line 114 or from line 114 to line 106, the light-emitting elements of the photocoupler 200 emit light and the transistor on the light-receiving side is turned on, whereby the potential on line 132 is changed from +5 V to 0 V. When the call current ceases flowing, on the other hand, the transistor on the light-receiving side is turned off, whereby the potential on line 132 is changed from 0 V to +5 V.

After a reply to an incoming call from line wires 102, 103 or in response to an outgoing call from the power-failure telephone 810, a call current from line wire 102 is passed through a DC circuit in power-failure telephone 810 via the call-status monitoring unit 107, line 113 and line 135. The current then flows from the telephone 810 to line 103 via line 134, line 114, the light-emitting elements of the photocoupler 200 in the call-status monitoring unit 107, and line wire 103.

The light-emitting elements of the photocoupler 200 at this time emit light so that the light-receiving transistor is turned on. However, since a power failure is in effect, the power of +5 V is not being supplied to the transistor. Therefore, an electric signal does not appear on the signal line 132. Under these conditions, the call is allowed to continue even after the power failure.

OPERATION IMMEDIATELY AFTER POWER RESTORATION

Figure 9:
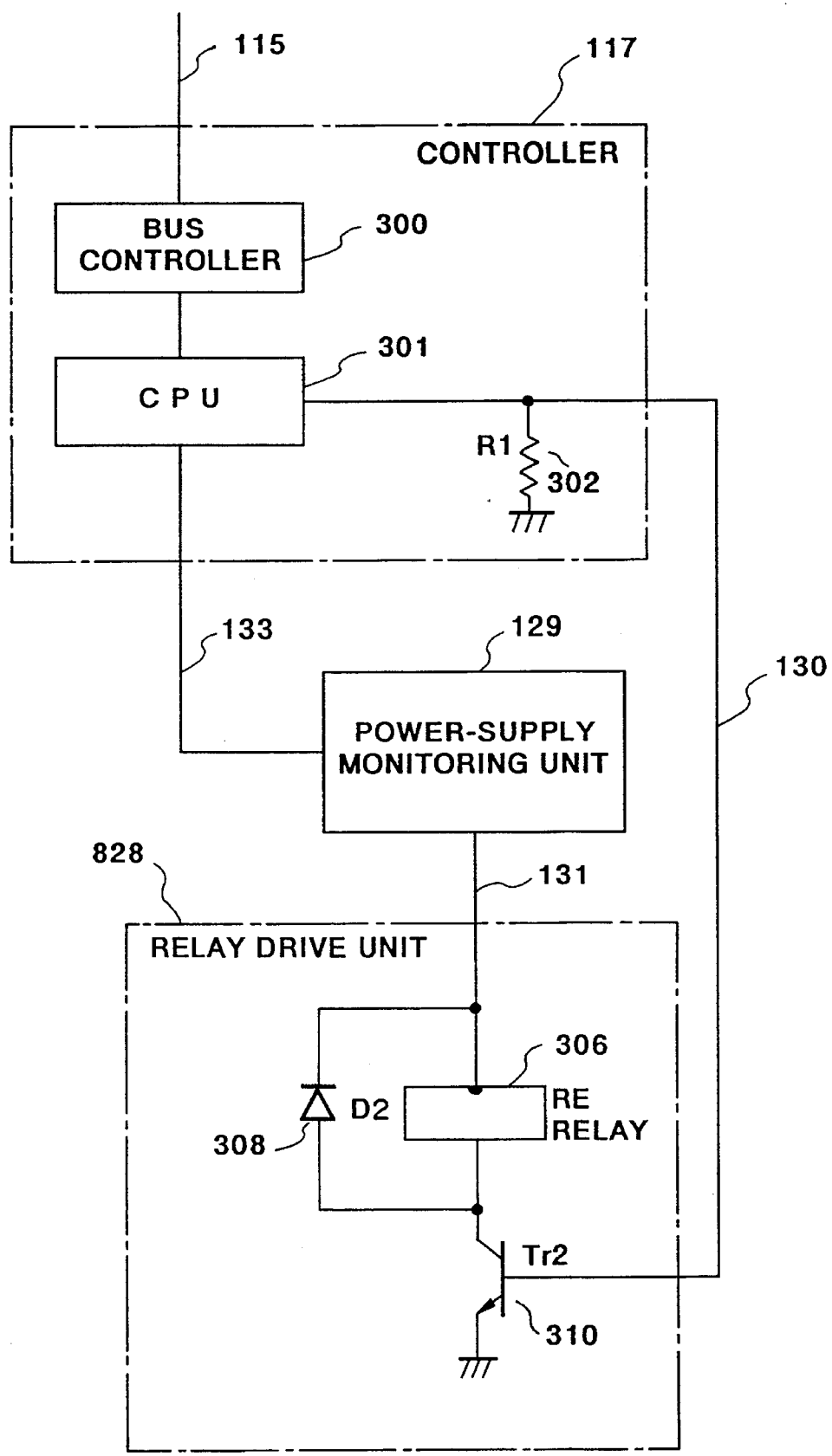
FIG. 9 is a block diagram illustrating the principal portion of a relay drive unit shown in FIG. 8.

When the problem in the power supply for supplying power to the private branch exchange apparatus 800 is solved, recovery is effected from the power failure and flow of current is restored, the power-supply status monitoring unit 129 sends a restoration signal to the controller 117 via the signal line 133 and to the relay drive unit 828 via the signal line 131. FIG. 9 illustrates the construction of the controller 117 and relay drive unit 828.

The controller 117 in FIG. 9 includes the bus controller 300 connected to the control bus 115 for performing bus control, and to the CPU 301 comprising a microprocessor or the like. The output terminal of CPU 301 for connecting the signal line 130 to the relay driving unit 828 attains a high-impedance state, when the CPU 301 is in the reset state, if a three-state circuit is used. The signal line 130 can be fixed at a potential of 0 V at this time by the resistor 302. The signal line 133 from the power-supply monitoring unit 129 also is connected to the CPU 301.

The relay drive unit 828 also includes the RE relay 306 whose contacts re0, re1 are in the line changeover unit 822.

The diode D2 308 is for protecting the relay from back emf. Numeral 310 denotes the transistor $Tr_2$. Since no electricity is supplied from the power-supply monitoring unit 129 via signal line 131 at the time of a power failure, the RE relay 306 is not driven, and therefore the contacts thereof are connected as indicated by the solid lines in FIG. 8.

Immediately after the restoration from the power failure, the power-supply monitoring unit 129 detects such restoration. When this is done, relay-driving power starts being supplied to the relay drive unit 828 through the signal line 131, and the CPU 301 of the controller 117 is informed of restoration via signal line 133. Since the power of +5 V is supplied to each of the components with restoration, the electric circuitry begins operating.

For several tens of milliseconds immediately after the rise in voltage to +5 V, a power-on reset signal generally is supplied to each of the components in order to initialize the status of the overall apparatus. The CPU 301 also is reset as a result. Since the signal line 130 is fixed at 0 V at this time, as described above, the RE relay 306 can be prevented from operating unstably during the transient period at rise of the 5 V power supply. When the reset state ends, the CPU 301 immediately outputs 0 V to the signal line 130 to turn off the transistor $Tr_2$ in order to hold the RE relay 306 in the power-failure state.

When a transition is made to operation of the call-status monitoring unit 107 in FIG. 2, the +5 V power supply rises to this voltage. When this is done, the 0 V signal is sent from signal line 132 to the line-wire interface 110, as described above, if a call is in progress. When the line-wire interface 110 receives this 0 V signal, the CPU 301 of the controller 117 is informed via control bus 115, after the reset state is terminated, of the fact that a call is in progress. As a result, the CPU 301 continues to output 0 V to signal line 130 and holds the RE relay 306 in the power-failure state. At the same time, the controller 117 performs control in such a manner that the line wires 102, 103 are seized through the line-wire interface 110 via the control bus 115, i.e., in such a manner that a DC circuit is formed in parallel with the telephone 810 presently involved in a call. A speaking circuit is thus formed. Further, the channel switch 112 is controlled so that a call path is implemented via the line wire interface 110, channel 111, channel switch 112, channel 116, extension interface 119, lines 123, 124 and the power-failure telephone 810.

Immediately after this is accomplished, the relay drive unit 828 is controlled to drive the RE relay 306 and disconnect the line-wire interface of the telephone 810 from the line-wire side. Even if the circuit is cut on the line-wire side by the line changeover unit 822, the call immediately after the restoration of power is maintained through the aforementioned path which includes the channel switch 112.

This state is the same as the call state formed, at presence of a call current, in the ordinary state at transmission from the extension telephone 810 to the line wires or after a response to an incoming call from the line wires. Accordingly, various service functions possessed by the main apparatus 800, such as hold, transfer and conference calls, can be used, even right after the restoration of power.

On the other hand, if a call is not in progress at restoration of power, the +5 V signal is sent from signal line 132 to the line-wire interface 110, as set forth earlier. When the line-wire interface 110 receives this +5 V signal, the CPU 301 of controller 117 is informed via control bus 115, after the reset state is terminated, of the fact that a call is not in progress. As a result, the CPU 301 outputs +5 V to signal line 130 to turn on the transistor 310, thereby driving the RE relay 306 so that the contacts thereof are connected to the sides indicated by the dashed lines in FIG. 8.

In accordance with the embodiment described above, the main apparatus is provided with means for monitoring the status of a call which uses the line-wire interface of the power-failure telephone immediately after restoration from a power failure. If, based upon the results of monitoring, the telephone is involved in a call immediately after the restoration of power, the call is established via the channel switch and the connection of the line-wire interface of the power-failure telephone is severed. As a result, a call allowed to continue from the onset of the power failure is maintained even immediately after power is restored. Moreover, various service functions possessed by the main apparatus, such as hold, transfer and conference calls, can be used.

In the embodiment set forth above, the arrangement illustrated is such that the connection is changed over solely to the channel switch at restoration of power, that making various service functions possible. With this method, however, a problem encountered is that if a power failure should reoccur after the restoration of power, the call that was allowed to continue will be cut off while in progress.

Accordingly, the foregoing embodiment is such that if a call is in progress when power is restored, the controller 117 forms the call path, which relies upon the channel switch 112, and does not return the RE relay 306 to the ordinary state. As a result, both the channel switch 112 and the power-failure lines, which use the line-wire interface of the power-failure telephone 810, are held.

In accordance with such control, various service functions of the main apparatus can be utilized after the restoration of power, and a call in progress will not be interrupted even in the event of reoccurrence of a power failure.

In accordance with the third embodiment, as described above, there is provided a private branch exchange which accommodates line wires and extensions, as well as so-called power-failure communications equipment, which has both an extension interface and a line-wire interface, on the extension side, wherein communication by the power-failure communications equipment is carried out when a power failure occurs. The apparatus includes a channel switch for switching connecting lines of the line wires and extension when power is fed to the apparatus, means for connecting the line wires and the line-wire interface of the power-failure communications equipment in dependence upon the status of power feed to the private branch exchange, monitoring means for monitoring the status of communication of the power-failure communications equipment after restoration of power, and control means for automatically holding or severing the connection between the line wires and the line-wire interface of the power-failure communications equipment in dependence upon an output from the monitoring means, wherein if the connection between the line wires and the line-wire interface of the power-failure communications equipment is held after the restoration of power, a state of communication is established between the line wires and the power-failure communications equipment via the channel switch. As a result, a call allowed to continue from the onset of a power failure can be held immediately after the restoration of power. Moreover, various service functions of the exchange employing the channel switch can be utilized immediately after the restoration of power.

A fourth and final embodiment of the present invention will now be described with reference to the drawings.

In the first through third embodiments described above, the changeover of the line wires and extension is performed on the main-apparatus side of the private branch exchange. In this embodiment, however, the changeover is carried out on the side of the telephone usable also in the event of a power failure.

Figure 10A:
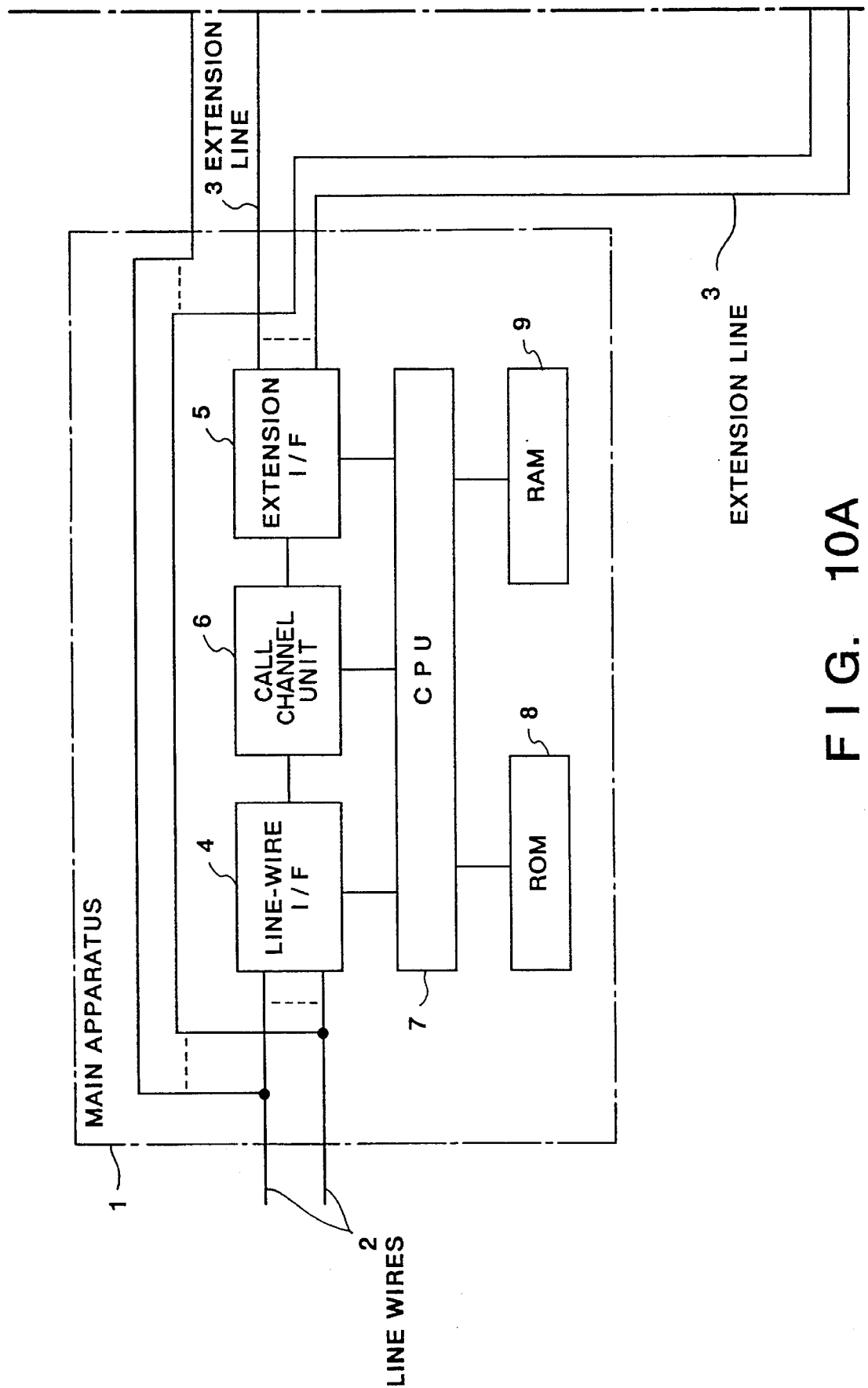
FIGS. 10A–10B is a block diagram illustrating a private branch exchange in a fourth embodiment of the present invention.
Figure 10B:
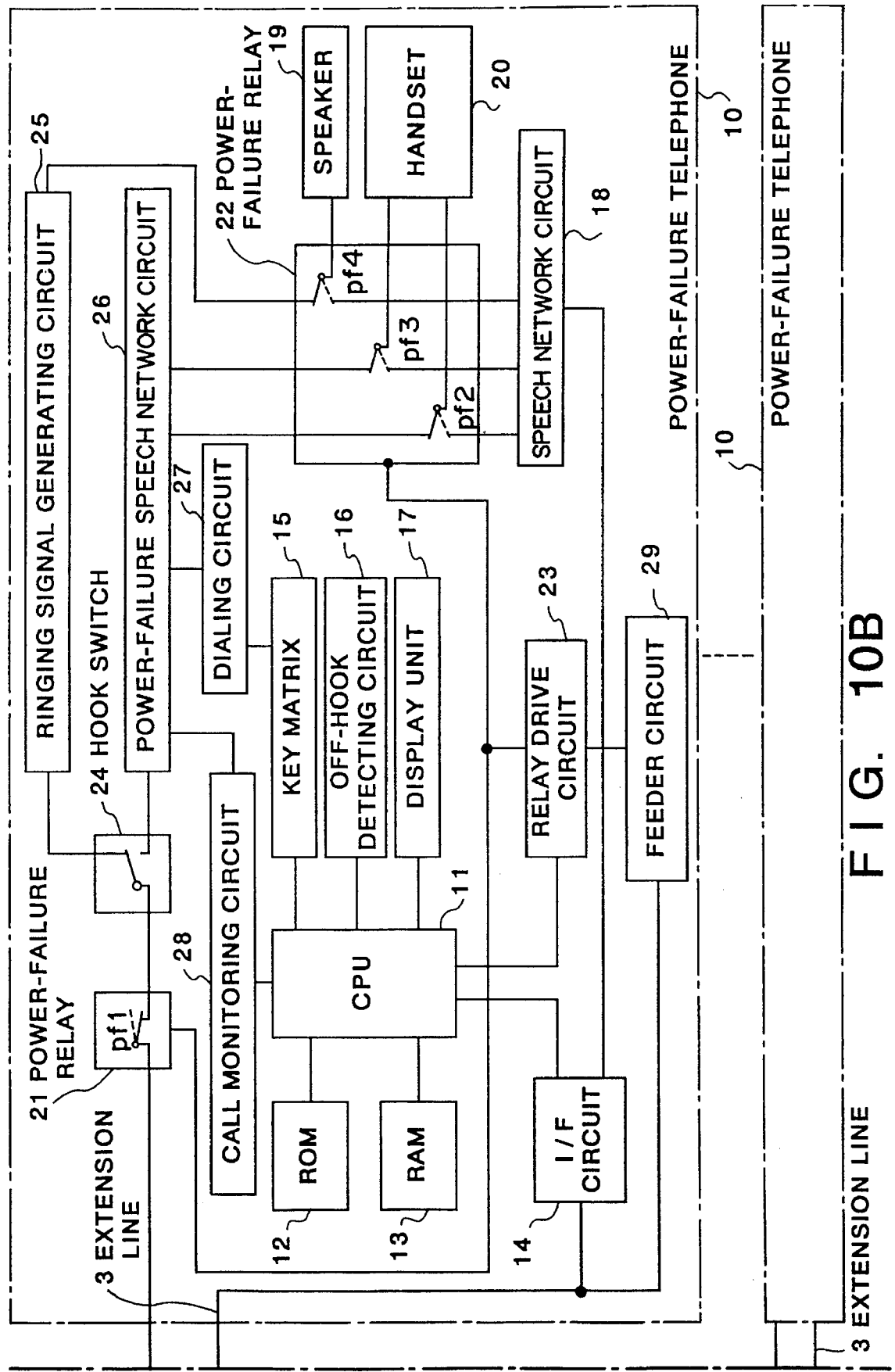

FIG. 10 is a block diagram illustrating the construction of a private branch exchange system in the fourth embodiment.

In FIG. 10, numeral 1 denotes the main apparatus which mainly comprises a line-wire interface 4, an extension interface 5, a call channel unit 6 for administering the switching of calls by time-division switching, and a CPU 7 for administering control of each of the components of the main apparatus 1, and for executing communication with a telephone, which is connected to an extension, via an extension line 3. A ROM 8 for storing the control program of the CPU and a RAM 9 used as a work area are connected to the CPU 7.

In FIG. 10, numeral 2 is line wires. The block indicated by numeral 10 on the right-hand side of FIG. 10 is a telephone usable also in the event of a power failure. (As shown in FIG. 10, a plurality of these telephones are capable of being connected to the main apparatus 1.) The telephone 10 is connected to the main apparatus 1 by the extension lines 3. Also the main apparatus 1 is capable of accommodating a extension telephone which can not communication in the power failure. The structure of the power-failure telephone 10 will now be described.

The telephone 10 includes a CPU 11 for administering control of the overall telephone, a ROM 12 storing the control program of the CPU 11, a RAM 13 which stores various control data and various information of the telephone 10, and which provides a working area for various types of processing, an interface circuit 14 for performing an exchange of communication signals and control signals with the main apparatus 1, a key matrix 15 which accepts inputs from numeric keys, function keys and the like, an off-hook detecting circuit 16, and a display unit 17.

The power-failure telephone 10 also includes a speech network circuit 18 used at the time of ordinary operation, namely when a power failure is not in effect, a speaker 19, and a handset 20. In the event of a power failure, only the handset 20 is used in a conversation, and the speaker 19 is used only for ringing at the time of a power failure.

Further, the telephone 10 includes power-failure relays 21, 22. The power-failure relay 21 is for connecting the channel at the time of a power failure, and the power-failure relay 22 is for connecting the speaker 19 and the handset 20 to either the ordinary speech network circuit 18 or a speech network circuit 26 for use in the event of a power failure and a ringing-signal generating circuit 25. These power-failure relays are changed over, under the control of the CPU 11, depending upon the state of power feed from a feeder circuit 29. The positions of the contacts indicated by the dashed lines are make positions for a case where power feed is being performed normally and a relay drive circuit 23 is ON owing to control performed by the CPU 11. These contact positions are held by passage of a current through the relays. The positions of the contacts indicated by the solid lines are break positions for a case where a power failure has occurred or power is being supplied and the relay drive circuit 23 is OFF owing to control performed by the CPU 11.

The relay drive circuit 23 for driving the aforesaid relays holds the power-failure relays 21, 22 in the aforementioned make positions in a case where power feed is being performed normally and drive circuit is ON owing to control by the CPU 11.

The power-failure telephone 10 is further provided with a hook switch 24, a ringing-signal generating circuit 25, a power-failure speech network circuit 26, a dialing circuit 27, a call monitoring circuit 28, and a circuit 29 for feeding the telephone with power. The call monitoring circuit 28 detects the status of a call (the status of an on-hook signal) at restoration of power. The detailed construction of this circuit will be described later.

The operation of this apparatus under ordinary circumstances, operation when a power failure occurs, operation when a call is in progress during a power failure, operation immediately after power is restored, and operation at the end of a call following the restoration of power will now be described.

ORDINARY OPERATION

In the ordinary state, namely the state in which current is being fed, the relay drive circuit 23 is placed in the ON state by the CPU 11, so that relays pf1, pf2, pf3 and pf4 are changed over to the make side, indicated by the dashed lines. As a result, the ringing signal generating circuit 25, power-failure speech network circuit 26, dialing circuit 27 and call monitoring circuit 28 are not fed with power, and the call is implemented by the path constituted by the speech network circuit 18, interface circuit 14 and extension lines 3.

OPERATION AT OCCURRENCE OF POWER FAILURE

When a power failure occurs and feed to the main apparatus 1 ceases, feed from the feeder circuit 29 in the power-failure telephone 10 also ceases, as a result of which the relay drive circuit 23, CPU 11, ROM 12, RAM 13, interface circuit 14, off-hook detecting circuit 16, display unit 17 and speech network circuit 18 get to be not fed. Accordingly, the relays pf1, pf2, pf3 and pf4 of the power-failure relays 21, 22 are changed over to the break side indicated by the solid line, and line wire 2 is directly connected to the hook switch 24 without connecting the channel unit 6.

CALL OPERATION DURING POWER FAILURE

The details of the construction of the call monitoring circuit and related portions are illustrated in FIG. 11. Portions similar to those shown in FIG. 10 are indicated by like reference characters.

The line wires 2 are connected to the power-failure speech network circuit 26 via the hook switch 24 (see FIG. 10). The speech network circuit 26 includes a parallel connected capacitor 34 and rectifier stack 35. The + output of the rectifier stack 35 is inputted to the call monitoring circuit 28 via a resistor 33 and is connected to a resistor 31 within the call monitoring circuit 28.

The call monitoring circuit 28 is connected to a line of the power-failure speech network circuit 26 via the resistor 33. The call monitoring circuit 28 comprises a photocoupler 30 for detecting a call on this line, the resistor 31 and a resistor 32.

The operation through which an outgoing call is made from the power-failure telephone to the line wires 2 will now be described.

When the handset 20 is lifted (taken off the hook), the line wires 2 are connected to the power-failure speech network circuit 26 by the hook switch 24 via the power-failure relay 21, and a loop is closed at the proper impedance by the power-failure speech network circuit 26.

As a result, a dial tone is returned from the local exchange of the line wires 2 and dialing is performed using the key matrix 15. In accordance with the input from the key matrix 15, an outgoing call is made to the line wires 2 by DP or PB via the dialing circuit 27. Thereafter, a telephone conversation is carried out when there is a response from the called party on the side of line wires 2.

In a case where a power failure is in effect and an incoming call is received from the line wires 2, i.e., an incoming call arrives from the line wires 2 in a state where the handset 20 is on the hook, the incoming signal enters the ringing signal generating circuit 25 via the power-failure relay 21 and hook switch 24, and an incoming tone is outputted to the speaker 19 from the ringing signal generating circuit 25.

When the incoming call is responded to by lifting the handset 20 (taking the handset off the hook), the hook switch 24 is changed over to the side of the power-failure speech network circuit 26 and a telephone conversation is carried out.

In the above-described outgoing and incoming call operations, lifting the handset 20 connects the line wires 2 to the power-failure speech network circuit 26 via the hook switch 24. When this occurs, the power-failure speech network circuit 26 is fed from the line wires 2 and the output side (the + and − terminals) of the rectifier stack 35 develops a voltage. During a power failure, however, the +5 V power supply shown in the call monitoring circuit 28 of FIG. 11 vanishes and the CPU 11 stops being supplied with power.

OPERATION AT RESTORATION OF POWER

When a telephone conversation is started during a power failure and power is restored while the conversation, which has been allowed to continue, is in progress, power feed to the main apparatus 1 is resumed and this is accompanied by start up of the feeder circuit 29 in the power-failure telephone 10. Accordingly, power is supplied to the relay drive circuit 23, CPU 11, ROM 12, RAM 13, interface circuit 14, off-hook detecting circuit 16, display unit 17 and speech network circuit 18.

When power is thus supplied again, the CPU 11 effects a power-on reset and executes initializing processing by the reset operation. This processing includes placing the relay drive circuit 23 in the OFF state and holding the power-failure relays 21, 22 on the break sides indicated by the solid lines.

In a case where a telephone conversation is in effect since prior to the restoration of power, a voltage is produced at the output of the rectifier stack 35 in the power-failure speech network circuit 26 by feed from the line wires 2, as described above. Therefore, when the +5 V is fed to the photocoupler 30 via the resistor 32 owing to the restoration of power, a current flows into a light-emitting diode on the input side of the photocoupler 30 via the resistors 33, 31, and the collector output of the transistor on the output side falls to a low level.

In a case where the low-level output of the call monitoring circuit 28 is detected, the CPU 11 maintains the relay drive circuit 23 in the OFF state and holds the power-failure relays 21, 22 on the break sides indicated by the solid lines, thereby holding the call in progress.

OPERATION AT END OF CALL AFTER RESTORATION OF POWER

When, as described above, a held telephone conversation ends after the restoration of power and the handset 20 is hung up, the hook switch 24 is changed over from the side of the power-failure speech network circuit 26 to the side of the ringing signal generator circuit 25.

As a result, the line wires 2 connected to the power-failure speech network circuit 26 via the power-failure relay 21 and hook switch 24 are disconnected, the feed of power to the power-failure speech network circuit 26 ceases, and the voltage at the output side of the rectifier stack 35 vanishes. The current flowing into the light-emitting diode on the input side of the photocoupler 30 via the resistors 33, 31 also vanishes so that the collector output of the transistor on the output side assumes a high level.

Upon detecting the high-level output of the call monitoring circuit 28, the CPU 11 turns on the relay drive circuit 23 so that the power-failure relays 21, 22 are changed over to the make sides indicated by the dashed lines. Thereafter, the telephone conversation is carried out through the usual path.

In accordance with the fourth embodiment described above, a telephone for a power failure is internally provided with monitoring means for monitoring the call status of this telephone prevailing immediately after restoration from a power failure. Based upon the results of the monitoring operation, means for connecting line wires directly to a telephone for a power failure is controlled automatically. As a result, a telephone conversation continuing from the onset of a power failure can be held in this state immediately after the restoration of power, and the conversation in progress is no longer cut off at restoration of power, as occurs in the prior art.

Furthermore, the end of the call continuing since the onset of the power failure is detected and the usual operating state is restored automatically. Thus, the private branch exchange of the present invention does not require troublesome manual changeover means and therefore is easy to use and highly reliable.

Though a power-failure telephone is illustrated in the foregoing embodiment, the terminal apparatus is not limited to a telephone, and various communications equipment can be used.

In accordance with the fourth embodiment, as described above, there is provided a private branch exchange system which accommodates line wires and an extension, as well power-failure communications equipment on the extension side, wherein communication by the power-failure communications equipment is carried out when a power failure occurs. The power-failure communications equipment is provided with means for switchingly making a connection to a power-failure line which makes it possible to use the power-failure communications equipment in event of power failure, monitoring means for monitoring call status on the power-failure line, and control means for performing control in such a manner that, in a case where communication using the power-supply line is in the process of being continued at restoration from a power failure, a connection to the power-failure line is held until the communication ends, and a changeover is made to a main-line side after the end of the communication. As a result, communication allowed to continue from the onset of the power failure can be maintained immediately after power is restored. When communication ends, the ordinary operating state can be restored automatically. Accordingly, the private branch exchange system of the present invention does not require a troublesome manual operation, and line back-up and restoration processing at occurrence of a power failure are performed automatically and in a reliable manner.

As many apparently widely different embodiments of the present invention can be made without departing from the spirit and scope thereof, it is to be understood that the invention is not limited to the specific embodiments thereof except as defined in the appended claims.

What is claimed is:

1. A private branch exchange system comprising:

an extension terminal; and an exchange unit which accommodates said extension terminal and an external line and connects said extension terminal and said external line via a main channel or a sub-channel, the extension terminal communicating with the external line before a power failure occurs via the main channel, and the extension terminal communicating with the external line during a power failure via the sub-channel, wherein said extension terminal includes:

connecting means for connecting the exchange via the main channel or the sub-channel, detecting means for detecting use of said sub-channel, and holding means for holding a connection with the external line at restoration from the power failure in a case where use of said sub-channel is detected by said detecting means.

2. The private branch exchange system according to claim 1, wherein said holding means changes over a connection from said sub-channel to said main channel at restoration from a power failure in a case where use of said sub-channel is not detected by said detecting means.

3. The private branch exchange system according to claim 1, wherein said holding means changes over a connection from said sub-channel to said main channel after restoration from a power failure in a case where end of use of said sub-channel is detected by said detecting means.

4. The private branch exchange system according to claim 1, wherein said holding means holds a communication channel via said sub-channel, after restoration from a power failure, until end of use of said sub-channel is detected by said detecting means.

5. The private branch exchange system according to claim 1, wherein said holding means includes:

a relay for selectively connecting said main channel or said sub-channel;

supply means for supplying a drive signal to said relay; and control means for controlling said supply means.

6. The private branch exchange system according to claim 1, wherein said holding means includes connecting means for connecting said sub-channel to a keyboard for inputting dial data.

7. The private branch exchange system according to claim 1, wherein said holding means includes connecting means for connecting either said main channel or said sub-channel to a speaker for generating a ringing sound.

8. The private branch exchange system according to claim 1, wherein said extension terminal has a handset.

9. The private branch exchange system according to claim 8, wherein said holding means includes connecting means for connecting either said main channel or said sub-channel to said handset.

10. The private branch exchange system according to claim 1, wherein said detecting means detects use of said sub-channel based upon presence of an electric current in said sub-channel line.

11. A private branch exchange system comprising:

a channel switch for switchingly connecting before a power failure occurs at least one external line pair and an extension terminal, the extension terminal including communication equipment operable before a power failure occurs which has an extension interface for connecting the channel switch via an extension line on an extension side, wherein communication by said communication equipment is carried out when a power failure occurs, wherein said communication equipment includes:

connecting means for connecting the at least one external line wire pair and a line-wire interface of said communication equipment in dependence upon the status of power feed to said exchange;

monitoring means for monitoring the status of the communication of said communication equipment which prevails after restoration is made from a power failure; and control means for holding the connection between the at least one external line wire pair and the line-wire interface in dependence upon an output from said monitoring means, wherein if the connection between the at least one external line wire pair and the line-wire interface is held after the restoration is made from the power failure, the communication is established between the at least one external line wire pair and said communication equipment via said connecting means.

12. The private branch exchange according to claim 11, wherein if the connection between the at least one external line wire pair and the line-wire interface of said communication equipment is held after the restoration is made from the power failure, the connection between the at least one external line wire pair and the line-wire interface of said communications equipment is severed after a state of communication is established between the at least one external line wire pair and said communication equipment via said channel switch.

13. A terminal apparatus connectable to an exchange, comprising:

connecting means for connecting said terminal apparatus to the exchange via a main line for use before a power failure occurs or a sub-line for power failure;

monitoring means for monitoring the status of a call on said sub-line; and maintaining means for maintaining the call during the power failure if the call on said sub-line for power failure is continuing when restoration is made from a power failure.

14. The terminal apparatus according to claim 13, wherein said connecting means includes an interface for connecting said terminal apparatus to the exchange via the main line, a speech circuit for connecting the sub-line, and a switch for connecting a handset to the main line or the sub-line.

15. The terminal apparatus according to claim 13, wherein the sub-line is connected with an external line of the exchange, bypassing the exchange.

16. The terminal apparatus according to claim 13, wherein said connecting means includes a dialing circuit to be connected with the sub-channel.

17. The terminal apparatus according to claim 13, wherein said maintaining means releases a connection between said terminal apparatus and the sub-line after the call on the sub-line is over.

18. A switching method of a terminal apparatus including a connector for connecting the terminal apparatus to an exchange via a main line before a power failure occurs and via a sub-line when a power failure occurs, and a monitor for monitoring the status of a call on the sub-line, said method comprising the steps of:

connecting the terminal apparatus to the sub-line in dependence upon the status of power feed to the exchange; and performing control in such a manner that, if communication using the sub-line is continuing when restoration is made from a power failure, the communication during the power failure is maintained until the communication ends.

19. The switching method according to claim 18, wherein the terminal apparatus is connected to the main line after the communication ends.

20. The switching method according to claim 18, wherein the terminal apparatus is connected to the sub-line when the power failure occurs.

21. The switching method according to claim 18, wherein the terminal apparatus is connected to the main line if the communication using the sub-line is not performed when the restoration is made from the power failure.

22. A communication system comprising:

exchanging means for exchanging a plurality of external lines and a plurality of extension terminals before a power failure occurs; and first connecting means for connecting one of the plurality of external lines and one of the plurality of extension terminals, bypassing said exchanging means, in an event of a power failure, wherein the one of the plurality of extension terminals includes second connecting means for connecting said exchanging means via a main channel and said first connecting means via a sub-channel, and control means for controlling said second connecting means so as to continue to connect the one of the plurality of external lines and the one of the plurality of extension terminals at restoration from the power failure when the one of the plurality of extension terminals is in communication via the one of the plurality of the external lines.

23. The communication system according to claim 22, wherein said control means controls said second connecting means so as to disconnect the one of the plurality of external lines and the one of the plurality of extension terminals when the one of the plurality of extension terminals terminates communication.

24. A communication system comprising an exchanging apparatus and a plurality of extension terminals, said exchanging apparatus comprising:

exchanging means for exchanging a plurality of external lines and the plurality of extension terminals before a power failure occurs; and first connecting means for connecting one of the plurality of external lines and one of the plurality of extension terminals via a main pass using said exchanging means or a sub-pass bypassing said exchanging means, one of the plurality of extension terminals comprising:

communicating means for communicating via the plurality of external lines, second connecting means for selectively connecting the main pass or the sub-pass to said communicating means, and control means for controlling said second connecting means so as to continue to connect the sub-pass to said communicating means at restoration from the power failure when said communicating means is in communication via the sub-pass.

25. The communication system according to claim 24, wherein said control means controls said second connecting means so as to connect the main pass to said communicating means when said communicating means terminates communication.

* * * * *

UNITED STATES PATENT AND TRADEMARK OFFICE
CERTIFICATE OF CORRECTION

PATENT NO.   : 5,581,612
DATED        : Dec.. 3, 1996
INVENTOR(S)  : Shigeru Nishikawa It is certified that error appears in the above-identified patent and that said Letters Patent is hereby corrected as shown below:

On title page, item [56] "FOREIGN PATENT DOCUMENTS" insert the following:
-- 63-232599  9/1988  Japan .--

Signed and Sealed this

Seventeenth Day of March, 1998

*Attest:*

BRUCE LEHMAN

*Attesting Officer*        Commissioner of Patents and Trademarks

UNITED STATES PATENT AND TRADEMARK OFFICE
CERTIFICATE OF CORRECTION

PATENT NO. : 5,581,612
DATED : Dec. 3, 1996
INVENTOR(S) : Shigeru Nishikawa

It is certified that error appears in the above-identified patent and that said Letters Patent is hereby corrected as shown below:

ON THE TITLE PAGE AT [56] REFERENCES CITED

FOREIGN PATENT DOCUMENTS

Insert:  --61-121594    6/1986    Japan 1-235452    9/1989    Japan--.

AT [73] ASSIGNEE

"Canon Kaubshiki Kaisha," should read --Canon Kabushiki Kaisha,--.

COLUMN 4

Line 66, "current-flows" should read --current flows--.

COLUMN 14

Line 2, "communication" should read --communicate--.

Signed and Sealed this

First Day of December, 1998

Attest:

BRUCE LEHMAN

*Attesting Officer*    Commissioner of Patents and Trademarks